No. 645,346. Patented Mar. 13, 1900.
F. BARRY.
BICYCLE SUPPORT.
(Application filed Nov. 28, 1899.)

(No Model.)

WITNESSES:
C. W. Smith

INVENTOR
Frederick Barry
BY
ATTORNEYS.

THE NORRIS PETERS CO., PHOTO-LITHO., WASHINGTON, D. C.

UNITED STATES PATENT OFFICE.

FREDERICK BARRY, OF SILVERTON, COLORADO.

BICYCLE-SUPPORT.

SPECIFICATION forming part of Letters Patent No. 645,346, dated March 13, 1900.

Application filed November 28, 1899. Serial No. 738,519. (No model.)

*To all whom it may concern:*

Be it known that I, FREDERICK BARRY, a citizen of the United States, residing at Silverton, in the county of San Juan and State of Colorado, have invented a new and Improved Bicycle-Support, of which the following is a full, clear, and exact description.

The object of the invention is to provide a new and improved bicycle-support which is simple and durable in construction, easily applied, and arranged to permit the rider to conveniently put it in position to securely support and hold the bicycle in an upright position and to allow of folding it on the bicycle-frame when not in use.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
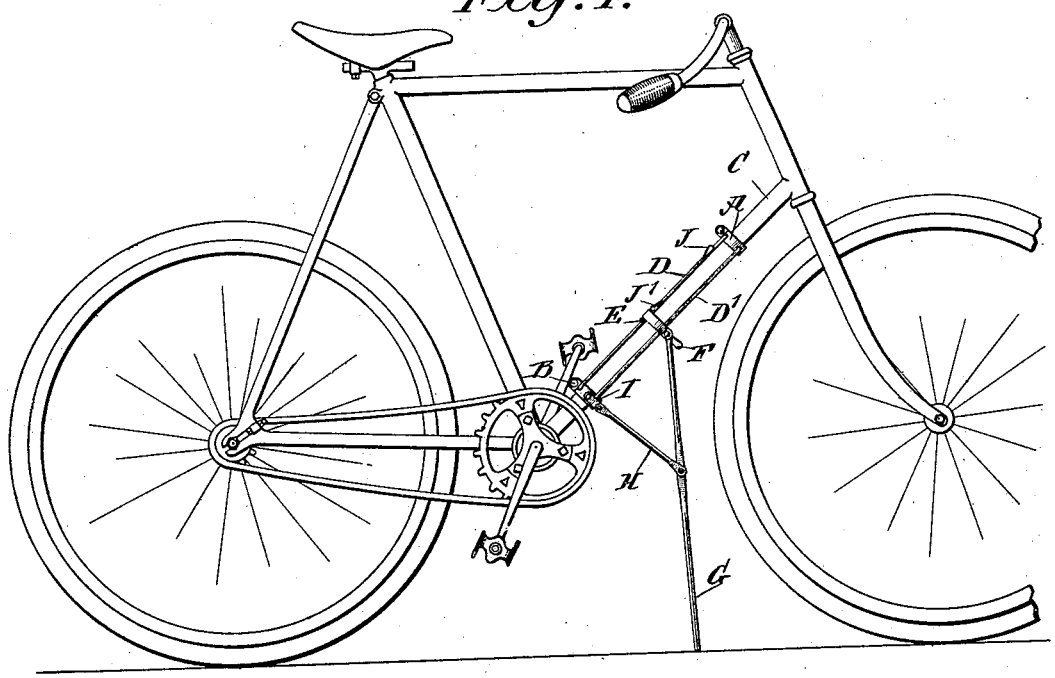
Figure 2:
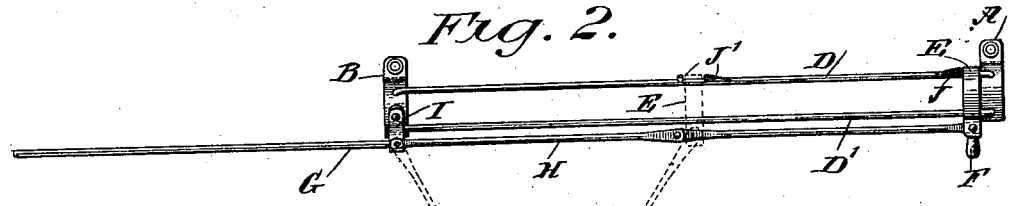
Figure 3:
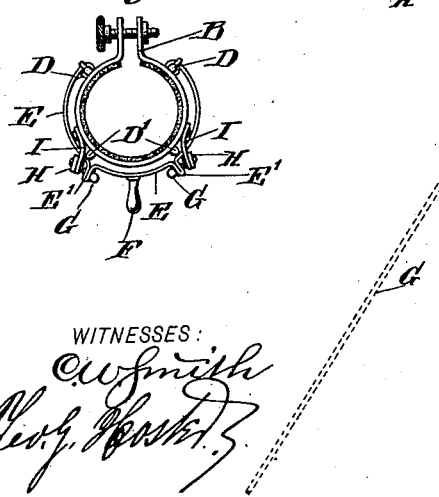
Figure 4:
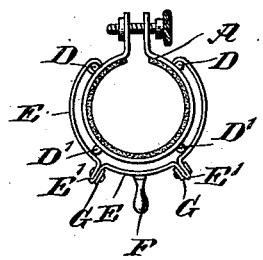

Figure 1 is a side elevation of the improvement as applied and in an open position. Fig. 2 is an enlarged side elevation of the improvement in a folded position, and Figs. 3 and 4 are end views of the same.

The improved support consists of two clips A and B, adapted to be fastened to the lower brace C of the bicycle-frame, as is plainly illustrated in Fig. 1, and the said clips are connected with each other by top rods D and bottom rods D', forming a guideway for a runner E to slide on, the said runner having a handle F, adapted to be taken hold of by the rider to move the runner either into a lowermost active position, as shown in Fig. 1, or into an uppermost position, as shown in Fig. 2. The rods D D' extend in alinement with the lower brace C, on the outside thereof, and the runner E is preferably made in the shape of a band formed at its ends with eyes engaging the upper rods D, the lower portion of the band engaging the outside of the rods D'. (See Figs. 3 and 4.) The band is also formed near its bottom with projections E', obliquely disposed, and on which are fulcrumed supporting-rods G, pivotally connected by links H with arms I, secured to or formed on the lower clip B, so that when the runner E is in a lowermost position, as shown in Fig. 1, then the rods G extend vertically downward to the ground to support the bicycle in an upright position, the links H extending approximately at a right angle from the lower brace C to the vertically-disposed supporting-rods G to hold the latter in the supporting position. The arms I extend slightly downwardly and outwardly, as plainly indicated in Fig. 3, so that when the runner E is moved into a lowermost position the links H are caused to swing to spread the rods G apart on opposite sides of the bicycle and securely hold the latter in an upright position. When the runner E is moved into an uppermost position, as shown in Fig. 2, then the rods G and the links H fold close to the brace C, and the rods D D' are in alinement with each other, so as to occupy very little room on the bicycle, the several parts of the support being completely out of the way of the rider, so as not to interfere with the proper propelling of the bicycle or the convenience of the rider.

In order to lock the runner E in its uppermost or lowermost position, suitable spring-catches J J' are provided and preferably arranged on the upper rods D.

The device is very simple and durable in construction and can be readily applied to the lower brace C or removed therefrom by simply opening the clips A and B and removing the same from the said brace, together with the parts carried by the clips.

Having thus fully described my invention, I claim as new and desire to secure by Letters Patent—

1. A bicycle-support, consisting of clips arranged for attachment to a bicycle-frame, rods extending from one clip to the other and connecting said clips, a runner having ears bent around said rods whereby it is fitted to slide on the same, supporting-rods pivotally secured to said runner, and links pivotally secured to the lower clip and the supporting-rods, as set forth.

2. A bicycle-support, comprising a guideway for removable attachment to the lower brace of a bicycle-frame, a runner mounted to slide on the guideway, a supporting-rod pivotally connected with said runner, a link pivotally connecting said supporting-rod with said guideway, and a plurality of catches secured at intervals on said guideway, to lock the runner in either an uppermost or lowermost position, the said runner sliding over and being frictionally held by said catches, substantially as shown and described.

3. A bicycle-support, comprising clips arranged for attachment to a bicycle-frame, rods connecting said clips, a runner in the form of a band having ears bent around two of said rods whereby it is fitted to slide thereon, supporting-rods pivotally secured to said runner, links pivotally secured to said supporting-rods, and to one of said clips, and spring-catches secured on said rods in the path of said runner, whereby to hold the supporting-rods in closed and open position, as set forth.

In testimony whereof I have signed my name to this specification in the presence of two subscribing witnesses.

FREDERICK BARRY.

Witnesses:
P. W. DOLAN,
FRANK ROGERS.